United States Patent [19]

Bayoumi

[11] Patent Number: 4,856,853
[45] Date of Patent: Aug. 15, 1989

[54] ENDLESS BELT-TYPE DRIVE MECHANISM

[75] Inventor: Salah E. A. Bayoumi, 26 Nile St., Dokki, Giza, Egypt

[73] Assignees: Salah E. A. Bayoumi, Giza, Egypt; Abbas F. Souka, Reston, Va.

[21] Appl. No.: 144,098

[22] Filed: Jan. 15, 1988

Related U.S. Application Data

[63] Continuation-in-part of Ser. No. 31,679, Mar. 30, 1987, abandoned.

[51] Int. Cl.$^4$ .......................................... B62D 55/205
[52] U.S. Cl. ................................. 305/35 EB; 305/38; 305/57; 474/901
[58] Field of Search ................... 305/19, 21, 24, 35 R, 305/35 EB, 38, 39, 56, 57; 474/152, 153, 901; 198/834

[56] References Cited

U.S. PATENT DOCUMENTS

| | | | |
|---|---|---|---|
| 1,107,874 | 8/1914 | Appleby | 305/57 X |
| 3,539,230 | 11/1970 | Comellas | 305/38 |
| 3,659,908 | 5/1972 | Comellas | 305/38 |
| 3,993,366 | 11/1976 | Orpana | 305/57 X |

FOREIGN PATENT DOCUMENTS 658255   3/1963   Canada .................................. 305/57

Primary Examiner—Russell D. Stormer
Attorney, Agent, or Firm—Burns, Doane, Swecker & Mathis

[57] ABSTRACT

A drive mechanism comprises an endless belt wrapped around a drive wheel. The drive wheel includes flat facets formed on its outer surface which are arranged to become superimposed relative to plate-like shoes mounted on the belt to impart a positive drive to the belt.

19 Claims, 4 Drawing Sheets

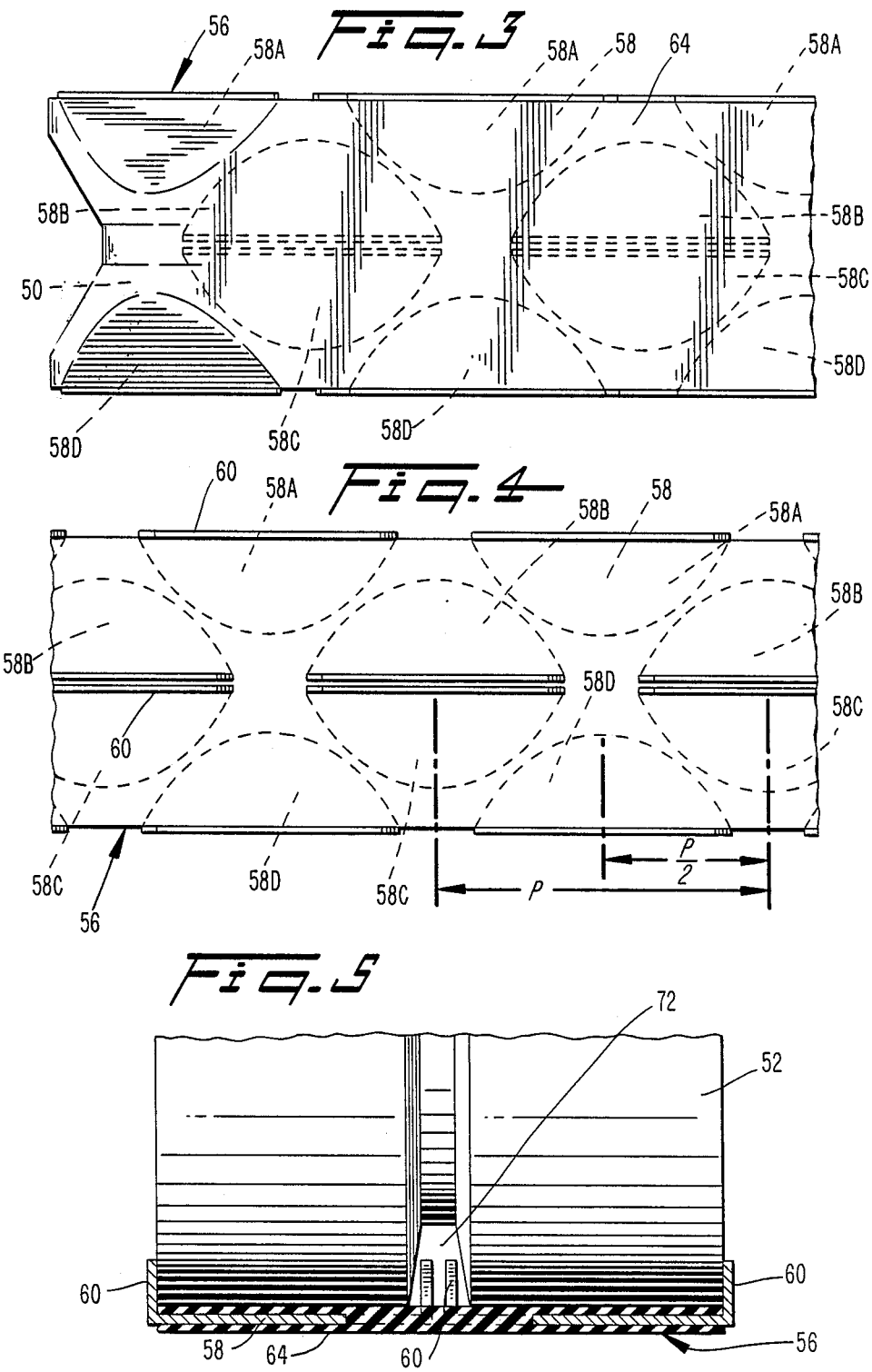

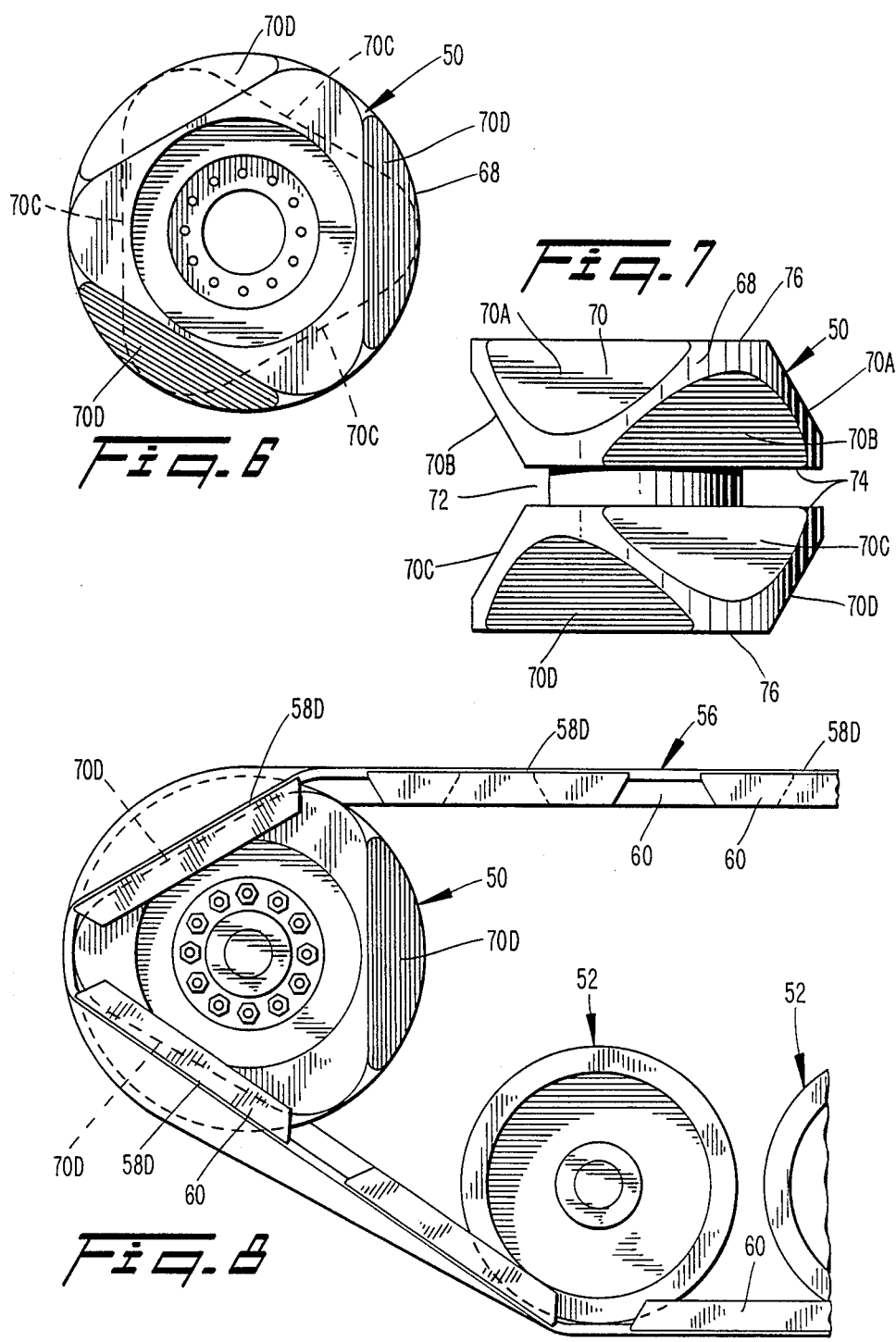

ENDLESS BELT-TYPE DRIVE MECHANISM

RELATED INVENTION

This is a continuation-in-part of my U.S. Application Ser. No. 07/031,679 filed Mar, 30, 1987, and now abandoned.

BACKGROUND OF THE INVENTION

The present invention relates to a driving arrangement wherein an endless belt is driven by a rotary drive wheel and, in particular, to a positive drive engagement between the belt and drive wheel.

In order to assure the mobility of wheeled vehicles on soft loose terrain, such as sand or snow for example, the wheels should support vehicle load without serious sinkage into the ground through the use of endless belts. When such belts are installed on tandem wheels they provide an increased area and length of contact and thereby improve flotation and traction.

Endless belts are known which are formed of an assembly of steel elements such as links, pins, shoes, etc. A simpler form of endless belt comprises an elastic belt such as reinforced rubber which provide a smoother ride and imparts less damage to the road surface than steel tracks. Elastic belts are driven by drive wheels either by a friction or positive engagement therewith. In the case of a friction drive, the belt must be pre-loaded in tension so as to firmly engage the drive wheel upon subsequent contraction. However, in order to obtain sufficient friction, such a strong tensioning must be achieved that the wheel bearings may be subjected to excessive loading.

Furthermore, the driving wheel and idler wheels are located at ground level to act as ground support wheels. Such an arrangement leads to bull-dozing and steering difficulties, especially on soft terrain. When operating on wet muddy terrain, the driving friction deteriorates and the drive transmission suffers from serious slippage.

The disadvantages associated with friction drives can be avoided by a positive drive wherein teeth on the elastic belt mesh with teeth on the drive wheel. Such a drive eliminates the need to tension the belt and thus there exists no possibility of overloading the belt and wheel bearings. Furthermore, the positive engagement between the teeth eliminates any chance of slippage. Also, the track can operate on a smaller wrap angle over the driving wheel which allows the driving wheel and idler to be located above ground level. That arrangement of the wheels provides better mobility at high speeds and less resistance to turns. However, such a drive involves drive wheels with a relatively small tooth pitch in order to maximize the number of teeth in mesh. That structure requires relatively high dimensional tolerances and accurate alignment, which characteristics are very costly to achieve and difficult to maintain under off-road conditions. Furthermore, the vulnerability of the teeth to shocks minimizes the maximum velocity which is attainable. Consequently, the utility of positive drive belts has been somewhat limited.

It would be further desirable to provide a positive drive for an endless belt/rotary drive wheel arrangement which eliminates the problems discussed above.

SUMMARY OF THE INVENTION

The present invention relates to an endless belt type drive mechanism for use with multiple axles. That mechanism includes a drive wheel and a flexible band extending around a portion of an outer peripheral surface of the drive wheel. That peripheral surface is formed with at least two circumferential rows of substantially flat facets. The facets of one row are circumferentially offset and overlapped relative to the facets of an adjacent row. The facets lie in planes oriented non-tangentially relative to the drive wheel. The flexible band, preferably formed of an elastic material such as reinforced rubber, includes a plurality of circumferential rows of plate-like shoes. The shoes are shaped generally similarly to the facets. The shoes of a first of the rows of shoes are circumferentially offset and overlapped relative to the shoes of an adjacent row by the same distance as the circumferential overlapping of the rows of facets, so that the shoes are superimposed on respective facets to be positively driven thereby.

Preferably, there are four rows of shoes and four rows of facets. A gap may be formed between two innermost rows of facets to receive guide lips of the shoes in order to restrain the band laterally.

The shoes and facets may also be offset and overlapping in the lateral direction as well as in the circumferential direction. The length of each shoe is preferably at least as great as the spacing between successive idler wheels located behind and below the drive wheel.

The invention also pertains to a belt per se comprising a band and a plurality of rows of shoes arranged as described above.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIG. 3 is a plan view of an outer, ground engaging surface of the belt;

FIG. 4 is a plan view of an inner wheel-engaging surface of the belt;

FIG. 5 is a vertical sectional view taken through the belt at a location in front of an idler roll;

FIG. 6 is a side elevational view of a drive wheel according to the present invention;

FIG. 7 is a plan view of the drive wheel;

FIG. 8 is a side elevational view of the drive wheel with the belt wrapped therearound;

DETAILED DESCRIPTION OF PREFERRED EMBODIMENTS OF THE INVENTION

Figure 1:
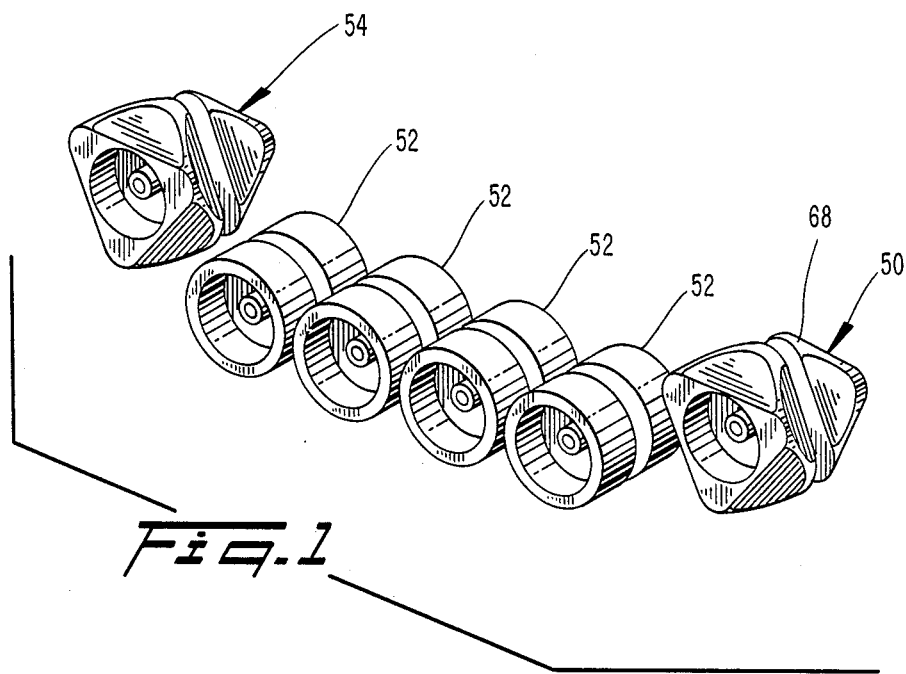
FIG. 1 is a perspective view of a wheel arrangement according to the present invention.
Figure 2:
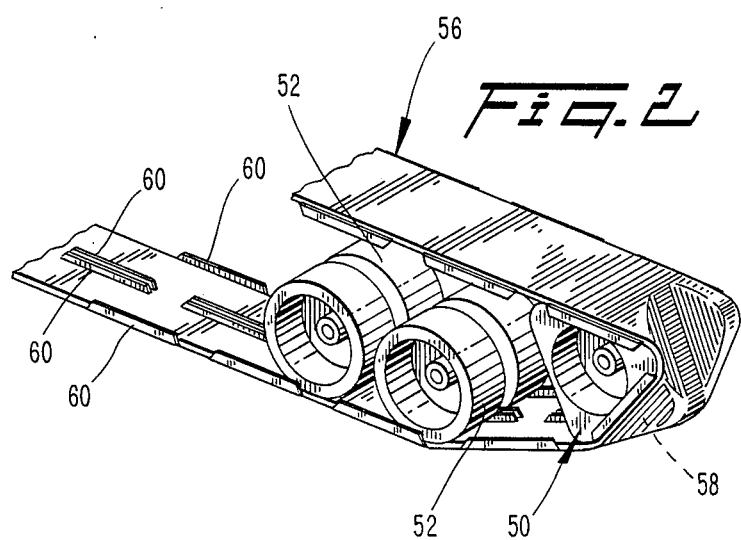
FIG. 2 is a perspective view of some of the wheels and a portion of an endless belt according to the present invention.
Figure 9:
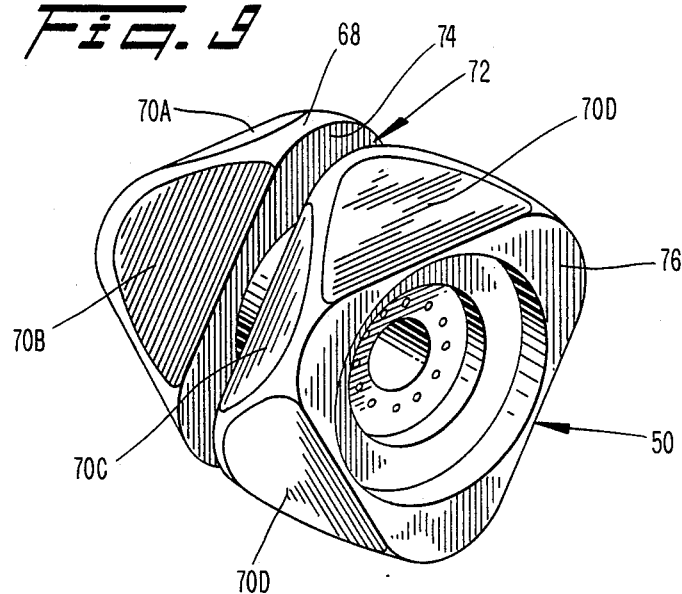
FIG. 9 is a perspective view of the drive wheel.
Figure 10:
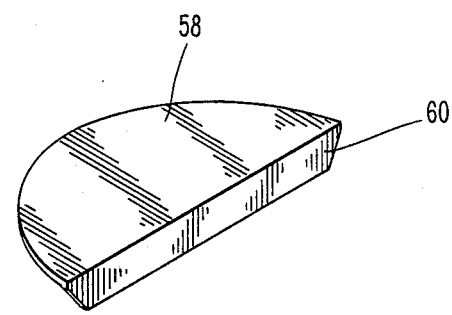
FIG. 10 and 11 are perspective views of a shoe to be mounted to the belt in accordance with the present invention.
Figure 11:
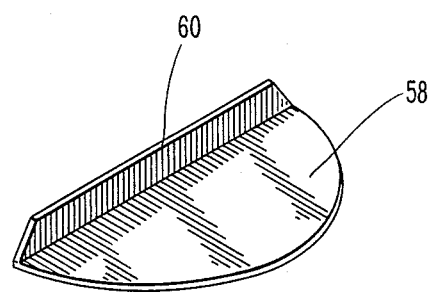

In FIGS. 1 and 2, there is depicted an endless belt-type driving arrangement comprising a drive wheel 50, a plurality of ground-supporting wheels 52, an idler wheel 54, and an elastic belt 56 extending around the wheels 50, 52, 54.

The belt 56 comprises a band of flexible material on which is disposed a plurality of shoes 58 arranged as axially adjacent circumferential rows of shoes 58A, 58B, 58C, 58D. Shoes 58A are circumferentially offset and overlapped relative to rows 58B and 58C, and shoes 58B, 58C are similarly offset and overlapped relative to shoes 58D by an offset distance of one-half of a pitch P. Rows 58A and 58B are circumferentially symmetrical with rows 58D and 58C, respectively. While four rows of shoes are depicted, any suitable number of rows could be utilized.

It will also be appreciated that the shoes of each outer row overlap the shoes of an adjacent row in a lateral direction, i.e., parallel to direction of rotation (see FIG. 3).

The shoes 58 comprise substantially rigid flat plates formed of any suitable material such as steel for example. The shoes may have numerous shapes but are preferably shaped as a segment of a segment of an ellipse. Such a shape could be generated by the intersection contours of a plane and the surface of a cylinder, with the plane inclined to the cylinder axis, as will become clear from a subsequent description of the drive wheel.

The shoes may be provided with bent straight edges that form right-angle lips 60. Those lips serve to increase the strength of the shoes, and function as lateral guides with respect to the wheels 50, 54 as will become apparent from the following description.

The shoes 58 could be attached to the outer or inner surface of the band. Alternatively, the band may comprise separate layers which are adhered together with the shoes sandwiched therebetween. The band is preferably formed of an elastic material such as reinforced rubber, although other flexible belt materials and configurations, e.g., meshed woven, etc., could be utilized.

If desired, gripping cleats could be mounted on the outer, ground engaging surface 64 of the band for maximizing traction.

The band is formed either as a permanently endless member or may be joined and disjoined at its ends by suitable couplings (not shown).

The drive wheel 50 includes an outer cylindrical surface 68 having formed thereon a plurality of flat seat-forming facets 70 arranged in circumferential rows 70A, 70B, 70C, 70D, the rows corresponding in number to the number of rows of shoes 58, i.e., four rows in the preferred embodiment. Each row of facets preferably comprises three facets, although any suitable number could be utilized.

The facets are configured in corresponding fashion to the shoes, e.g., as "segment of an ellipse" by cutting through the outer surface of a cylindrical wheel in a direction inclined to the axis of the wheel. The facets of each row are circumferentially offset relative to the facets of an immediately adjacent row by the same distance as the staggering of the rows of shoes, i.e., one-half of the pitch P. Thus, the facets of adjacent rows overlap each other circumferentially. Also, as is apparent from FIG. 7, the facets of each outermost row overlap the facets of an adjacent row in a lateral direction (i.e., parallel to the axis of rotation) in similar fashion to the lateral overlapping of the shoes. The facets of each outermost row are located axially opposite the respective facets of the outer outermost row, as is apparent from FIG. 7. The facets of the innermost rows are similarly arranged.

As noted earlier, each facet is disposed nontangentially relative to the wheel radius, i.e., each facet defines a plane which intersects the axis of rotation of the drive wheel. The inclination of each facet is such that, in a four-row arrangement, the facets of the two outermost rows 70A, 70D approach that axis in axially outward directions, and the facets of the two innermost rows approach the axis in an axially inward direction, i.e., toward one another.

It will be appreciated that as the drive wheel 50 is driven, with the belt wrapped therearound, the shoes of rows 58A, 58B, 58C, 58D become sequentially superimposed relative to the respective facets in rows 70A, 70B, 70C, 70D, respectively, whereupon the belt assumes a deformed shape corresponding to the peripheral shape of the faceted wheel. As a result of such a relationship, a positive slip-free driving relationship is established between the band and drive wheel.

Although the deformation of the band serves to resist axial (lateral) displacement of the band relative to the drive wheel, additional lateral guidance can be achieved by forming the drive wheel as two axially spaced portions 50A, 50B which define a gap 72 between the two innermost facet rows 70B, 70C for receiving the shoe lips 60 of the innermost rows 58B, 58C. Thus, those lips 60 may bear against inner sides 74 of the drive wheel. In corresponding fashion, the shoe lips 60 of the outermost rows 58A, 58D may bear against outer sides 76 of the drive wheel.

It will be appreciated that the idler wheel 54 is shaped in corresponding fashion to the drive wheel, and thus contains rows of facets which cooperate with the shoes, as well as gaps 72. Gaps 72 are formed in the ground support wheels 52 as well.

The length of each shoe in the circumferential direction is at least as great as the spacing between successive ground support wheels 52. This leads to a further advantage as the band travels beneath the ground support wheels 52. That is, the staggered (overlapping) relationship of the shoes causes the portion of the band underlying the ground support wheels to assume a rigid planar configuration, even in the areas between the ground support wheels. In the absence of the shoes, the band would assume a somewhat wavy appearance as viewed from the side since the band portions disposed between ground support wheels would not be pushed into a flattened orientation. Such a configuration of the band increases the pressure of the band against the ground in the areas between the ground support wheels, i.e., a more even force distribution is achieved.

It will be appreciated that the ground support wheels would be suspended for vertical movement relative to the drive wheel, as is customary in such arrangements.

The positive-drive arrangement according to the present invention requires, apart from replacing the drive wheel, idler wheel, and ground support wheels, no modification of the vehicle and thus existing vehicles can be retro-fit with belts according to the present invention. The ground bearing pressure distribution along the track length will be improved because the belt becomes rigid and provides better support for ground pressure between the ground support wheels 52.

It will be appreciated that the present invention may have other engineering applications in conveyor belts and power belt drives per se and is not limited to vehicle drives.

Although the present invention has been described in connection with preferred embodiments thereof, it will be appreciated by those skilled in the art that modifications, additions, deletions, and substitutions may be made without departing from the spirit and scope of the invention as defined in the appended claims.

What I claim is:

1. An endless belt-type drive mechanism comprising a drive wheel including an outer peripheral surface formed with at least two circumferential rows of facets, said facets of one row being circumferentially offset and overlapped relative to said facets of an adjacent row, said facets oriented non-tangentially relative to said drive wheel, and a flexible band extending around said drive wheel, said band including a plurality of circumferential rows of plate-like shoes, said shoes shaped generally similarly to said facets, said shoes of a first of said rows of shoes being circumferentially offset and overlapped relative to said shoes of an adjacent row by the same distance as the circumferential overlapping of said rows of facets so that said shoes are superimposed on respective said facets to be positively driven thereby 2. An endless belt-type drive mechanism according to claim 1, wherein there are four said rows of shoes and four said rows of facets.

3. An endless belt-type drive mechanism according to claim 2, wherein said facets of two axially outermost rows thereof are inclined so as to face generally axially outwardly, and said facets of two axially innermost rows thereof are inclined so as to face generally toward one another.

4. An endless belt-type drive mechanism according to claim 3, wherein a gap is formed between said two innermost rows of facets, said rows of shoes including two axially innermost rows of shoes having depending guide portions received in said gap.

5. An endless belt-type drive mechanism according to claim 1, wherein said shoes of two adjacent rows of shoes are laterally offset and overlapping, and said facets of two adjacent rows of facets being laterally offset and overlapping.

6. An endless belt-type drive mechanism according to claim 1 including a plurality of ground support idler wheels located below said drive wheel, the length of said shoes in the circumferential direction being at least as great as the spacing between said idler wheels.

7. An endless belt-type drive mechanism according to claim 14, wherein said shoes and facets are circumferentially offset by a distance equal to one-half of a pitch.

8. An endless belt-type drive mechanism according to claim 1, wherein said band is formed of an elastic material.

9. An endless belt-type belt according to claim 14, wherein said shoes and facets are in the shape of a segment of an ellipse.

10. In a vehicle comprising a drive wheel, a support wheel, idler ground-support wheels disposed below said drive wheel, and an endless belt extending around said drive wheel, said support wheel, and said idler wheels, the improvement wherein:
said drive wheel including an outer peripheral surface formed with at least four circumferential rows of facets, said facets of two axially outermost rows being circumferentially offset and overlapped relative to said facets of two axially innermost rows by a distance equal to one-half of a pitch, said facets oriented non-tangentially relative to said drive wheel, said facets of said outermost rows facing generally axially outwardly, and said facets of said innermost rows facing generally axially toward one another, and
said belt comprising a flexible band extending around said drive wheel, said band including four circumferential rows of plate-like shoes, said shoes shaped generally similarly to said facets, said shoes of two axially outermost rows of shoes being circumferentially offset and overlapped relative to said shoes of two axially innermost rows of shoes by the same distance as the circumferential overlapping of said rows of facets so that said shoes are superimposed on respective said facets to be positively driven thereby.

11. In a vehicle according to claim 10, said drive wheel, said support wheel, and said idler wheels each forming an outer peripheral gap between axial ends thereof, at least some of said shoes including depending guide portions received in said gaps to laterally constrain said band.

12. In a vehicle according to claim 10, wherein said facets of each of said axially outermost rows of facets are in axially offset and overlapping relationship with said facets of an adjacent innermost row of facets, said shoes of each of said axially outermost rows of shoes being in axially offset and overlapping relationship with said shoes of an adjacent innermost row of shoes.

13. In a vehicle according to claim 10, wherein the length of each of said shoes in the circumferential direction is at least as great as the spacing between said idler wheels.

14. A belt mountable on a driven vehicle wheel, said belt comprising flexible band means, a plurality of rows of shoes carried by said band means so as to form axially adjacent, circumferentially extending rows when said band means is mounted on said wheel, said shoes of a first of said rows being circumferentially offset and overlapped relative to said shoes of a second of said rows, said shoes formed of substantially rigid material.

15. A belt according to claim 14, wherein said shoes comprise substantially flat plates.

16. A belt according to claim 14, wherein said shoes of two adjacent rows are laterally offset and overlapping.

17. A belt according to claim 14, wherein said shoes of one row are circumferentially offset relative to said shoes of an adjacent row by a distance equal to one-half of a pitch.

18. Apparatus according to claim 14, wherein said band means is formed of reinforced rubber.

19. A belt according to claim 14, wherein some of said shoes include depending guide portions projecting out of the plane of said belt.

* * * * *